July 29, 1941.  K. BRATRING  2,251,109
METHOD OF PRODUCING HIGHLY LUSTROUS HOLLOW BODIES FROM ACETYL
CELLULOSE AND LIKE PLASTIC SUBSTANCES
Filed Jan. 19, 1939

INVENTOR
Kurt Bratring
BY Brown & Jones
ATTORNEYS

Patented July 29, 1941

2,251,109

UNITED STATES PATENT OFFICE 2,251,109

METHOD OF PRODUCING HIGHLY LUSTROUS HOLLOW BODIES FROM ACETYL CELLULOSE AND LIKE PLASTIC SUBSTANCES

Kurt Bratring, Dahlem, Berlin, Germany, assignor to Neocell Products Corporation Application January 19, 1939, Serial No. 251,838
In Germany May 7, 1936

4 Claims. (Cl. 18—58)

The invention of my present application, which is a continuation in part of my prior application Ser. No. 140,769, filed May 4, 1937, relates to a method of producing highly lustrous hollow bodies from cellulose acetate.

Such bodies are usually produced by dipping a mold in a solution of cellulose acetate in acetone or other suitable solvent. If a highly lustrous article is to be formed the molds should be hard, smooth and highly polished; for example the molds should be made of glass, but where such a mold is used it is found that the article deposited on it shrinks during drying to such an extent that it cannot be removed from the mold without injuring the article. On the other hand, if a soft collapsible mold be used the formed article is inferior, due to its relative lack of lustre.

Various expedients have been resorted to to overcome this difficulty. Among other things it has been suggested that if the formed article is soaked for a considerable time in boiling water it will soften and swell sufficiently so that it may be removed from the mold. Unfortunately, however, such swelling and softening cause a deformation of the article such that when it dries, its shape is distorted and its appearance injured; it becomes "milky" and opaque. In quantity production of articles of this character it is often desirable that the articles should be exceedingly uniform in size; as for example where the ultimate product is to be a container, consisting of a box and a cover, and where it is desired that the cover should fit nicely on the box. The process of removal of formed articles by swelling in boiling water cannot result in the production of articles of uniform size, or of a size sufficiently uniform for the purposes just described.

My present invention overcomes these difficulties; it is based upon the discovery which I have made that the swelling which takes place at moderate temperatures, say at 45° C., is very different in its nature and in its results from that which takes place at the temperature of boiling water, or 100° C.

For a fuller understanding of the invention reference should be had to the accompanying drawing, wherein.

Figure 1:
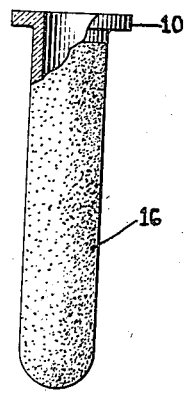
Fig. 1 represents a view in elevation with parts broken away of a mold coated with a suitable lubricant as hereinafter described.
Figure 2:
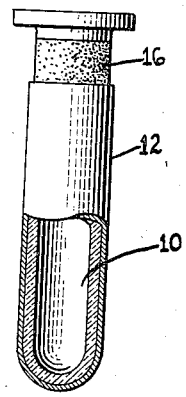
Fig. 2 represents a similar view of the mold coated with the lubricant and with a molded cellulosic compound of the type hereinafter specified.
Figure 3:
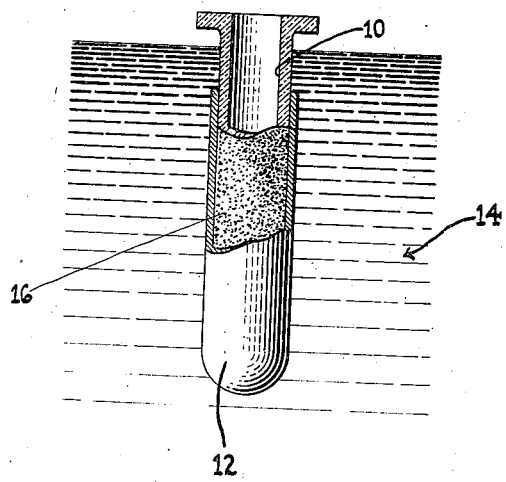
Fig. 3 is a similar view of the coated mold of Fig. 2 as it is subjected to moist heat by immersion in water.

As an example of the procedure which I follow in the practice of my invention, 500 grammes of cellulose acetate are dissolved in 4,000 cubic centimeters of acetone, and 160 grammes of triphenylphosphate are added. This solution, from which the air has been removed, is then applied to the mold 10 in an even layer, as by immersion or spraying or otherwise. The deposited layer is dried and the application of cellulose acetate solution and the drying are repeated as many times as is necessary to obtain a formed article 12 of the desired thickness. The formed article, still on the mold, is then very thoroughly dried in air at 45° C., for several hours, whereupon the molds, still bearing the formed articles, are immersed for a sufficient time, usually two or three hours, in water 14, as shown in Fig. 3, at a temperature of preferably 45 to 50° C., but in any case below the danger point, which is 60° C., in the case of cellulose acetate, at and above which permanent deformation takes place.

Figure 4:
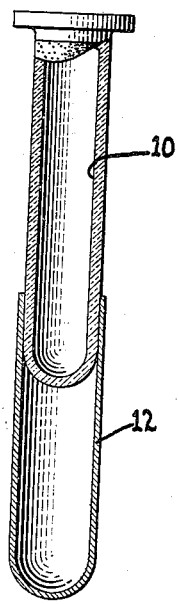
Fig. 4 is a similar view of the molded article being removed from the mold.

The articles can then be removed from the molds in any well known and usual manner, as shown in Fig. 4, whereupon it is found that although they have increased their size to a very small extent they afterwards reassume very accurately their former size and shape and retain their lustrous, transparent appearance.

The term "slight swelling" as used by me is distinguished from any softening effect. In fact the swelling is imperceptibly slight to such a degree that it could hardly be ascertained by ordinary measuring instruments. Anyhow, the imperceptible slight swelling is of such a nature that it allows of a removal of the molded article from the mold. That is the result aimed at by my present invention.

I have found by actual working that my invention may be successfully applied with articles made of cellulose esters, such as cellulose acetate and nitrocellulose, and that it is equally applicable with articles made of cellulose ethers, such as ethyl cellulose and benzyle cellulose. Although I prefer to apply my invention on a large scale with hollow articles made of cellulose acetate, I do not wish to be limited to such material.

Removal of the formed articles from the mold may be facilitated by giving to the molds before they are dipped into the dipping bath a thin coating of liquid lubricant 16, of such nature as not to react disadvantageously with the material of the formed article. Such lubricants used for this purpose are esters of adipic acid, esters of stearic acid, castor oil and similar substances which are not absorbed by the acetyl cellulose layer, or at least only to a harmless extent, and accordingly remain in the form of a lubricating layer between the wall of the core and the molded article formed thereon, or the lubricant may be mixed with the solution in the dipping bath, in which case it tends to pass out of the formed article during the drying operation and to concentrate in a thin layer between the formed article and the mold.

What I claim as new and desire to secure by Letters Patent is:

1. A method of producing a highly lustrous hollow body from cellulose esters or cellulose ethers, which consists in dipping a rigid polished mold in a solution of such cellulose derivatives, drying, and then subjecting the mold with formed article in place upon it to moist heat at a temperature above 45° C. and below 60° C., until the article has slightly swelled, and removing the article from the mold.

2. A method of producing a highly lustrous hollow body from cellulose acetate, which consists in dipping a rigid polished mold in a solution of cellulose acetate, drying, and then subjecting the mold with formed article in place upon it to a moist heat at a temperature between 45° C. and 60° C. until the article is slightly swelled, and removing the article from the mold.

3. A method of producing a highly lustrous hollow body from cellulose esters or cellulose ethers which consists in coating a rigid, polished mold with a lubricant, dipping said mold in a solution of such cellulose derivatives, drying, and then subjecting the mold with the formed article in place upon it to moist heat at a temperature between 45° C. and 60° C. until the article has slightly swelled, and removing the article from the mold.

4. A method of removing from a rigid, polished mold a cellulosic object formed thereon which comprises subjecting the mold with the formed article in place upon it to a moist heat at a temperature between 45° C. and 60° C. until the article has slightly swelled, and removing the article from the mold.

KURT BRATRING.